July 6, 1954     T. P. KOUVALLIS     2,682,829

FRANKFURTER COOKING APPLIANCE

Filed Feb. 21, 1951

INVENTOR:
Theodore P. Kouvallis
BY
Mils D. Stevens & Co.
Attorneys.

Patented July 6, 1954

2,682,829

UNITED STATES PATENT OFFICE 2,682,829

FRANKFURTER COOKING APPLIANCE

Theodore P. Kouvallis, Chicago, Ill.

Application February 21, 1951, Serial No. 212,058

1 Claim. (Cl. 99—389)

My invention relates to appliances for cooking frankfurters. Ordinarily, frankfurters are cooked by boiling in water; or they may be cooked on a grill in the open. Also, other methods exist for cooking this type of food, and each as its advantages insofar as facility, equipment and time are concerned. My invention deals more particularly with the serving of frankfurters in lunchrooms, where small orders are required to be filled at different times. In such case, the factors of time and compactness of equipment are of importance, and one object of my invention is therefore to provide an appliance which occupies a small space behind the counter and conveniently cooks small orders of the frankfurters.

A further object is to devise an appliance of the above character which is rapid in operation, whereby to render a quick service to the customers.

Another object is to include in the novel appliance a unit in the nature of an electric oven which retains the heat generated in the cooking zone, enabling the current to be turned off and the heat to remain effective for the cooking of the frankfurters.

An additional object is to provide a receptacle for the deposit of the frankfurters which is independent of the heating apparatus and particularly suitable for this type of food.

A still further object is to construct the appliance with a top which receives heat from the cooking zone to a sufficient degree in the manner of a hot plate for keeping warm the buns or other bread deposited on such top in readiness to receive the cooked frankfurters.

Another object is to provide simple means for removing the frankfurters to a point of access after they have been cooked.

With the above objects in view, and any others which may suggest themselves from the description to follow, a better understanding of the invention may be had by reference to the accompanying drawing, in which—

Figure 1:
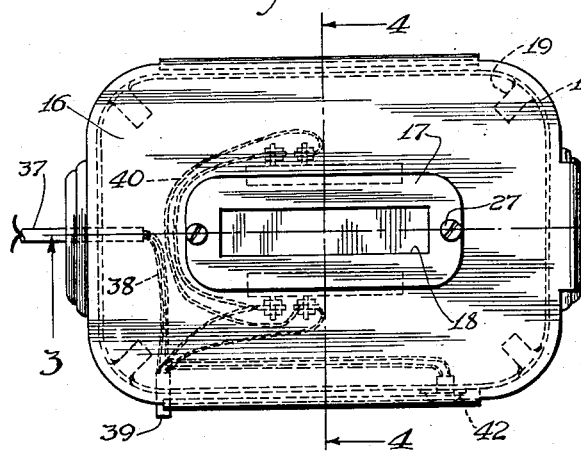
Fig. 1 is a top plan view of the appliance.
Figure 4:
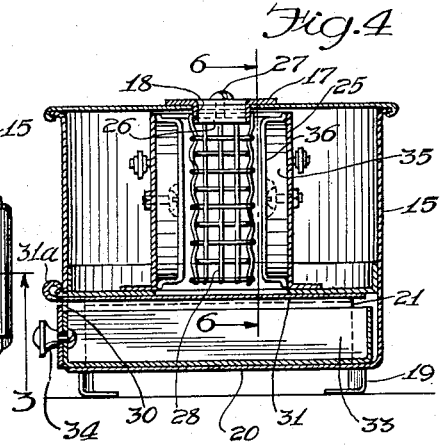
Figure 2:
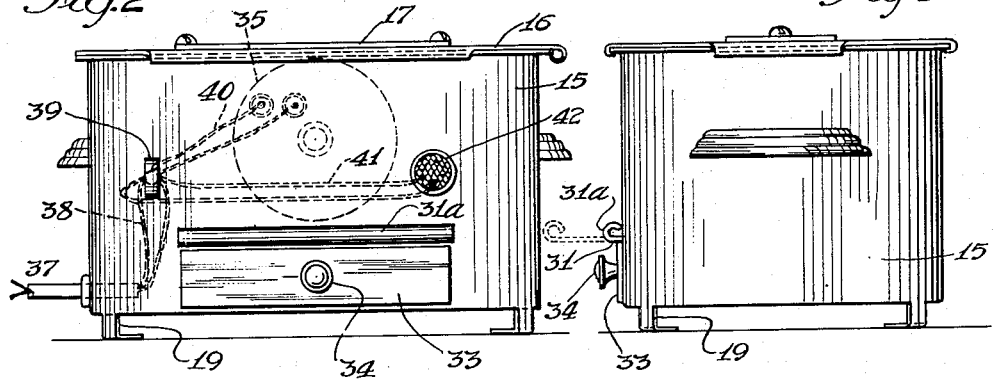
Fig. 2 is a front elevation.
Figure 5:
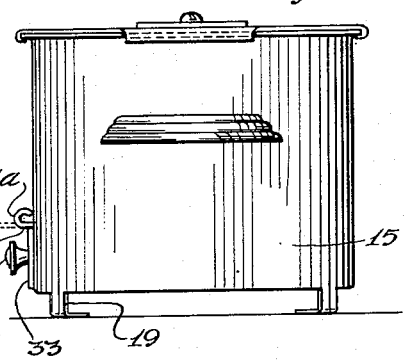
Figure 3:
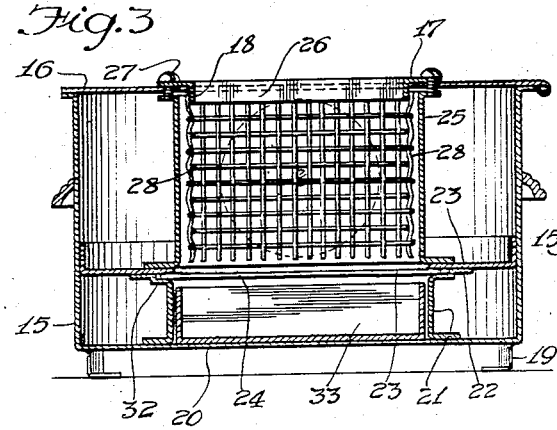

Figs. 3 and 4 are, respectively, sections on the lines 3—3 and 4—4 of Fig. 1;

Fig. 5 is a view from the right-hand side of Fig. 2; and

Figure 6:
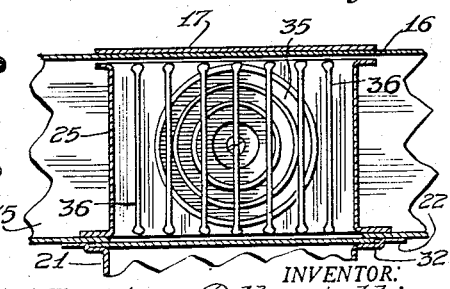

Fig. 6 is a section on the line 6—6 of Fig. 4.

In accordance with the foregoing, specific reference to the drawing indicates the housing of the appliance at 15, the same being of rectangular form and preferably constructed of sheet metal, which may be stainless steel for purposes of sanitation. The housing receives a top 16 of the same material, properly reinforced; and the top has a receptacle plate 17 formed with an oblong opening 18 for the deposit of the frankfurters into the appliance. At the bottom, the housing is extended with feet 19 supporting the appliance in raised position over a counter, table or other suitable surface.

Referring to Fig. 3, it is noted that the bottom 20 of the housing receives a pair of transversely positioned channels 21, these extending with outward brackets 22 at the top for the support of a tray 23. The tray has an oblong internal opening 24 and is designed to support a rectangular enclosure 25 over the opening 24 and dimensioned to receive an apron 26 of the receptacle plate 17. As indicated, bolts 27 are applied through the latter and the top 16 to thread into the enclosure 25 in order to retain its alinement with the receptacle plate.

The apron 26 of the receptacle plate carries a pendent grill container 28 of wire netting, such grill container being elongated in keeping with the form of the receptacle opening 18 and suitable for the deposit of a row of frankfurters in single or double order, according to size. The grill container 28 is open at the bottom.

Reference to Fig. 4 shows that the housing is made with a frontal horizontal slot 30 by means of which a slide 31 is inserted to occupy a position under the tray 23, the front edge of the slide being rolled, as indicated at 31a, to provide a handle. The upper portion of the channels 21 is formed as guides 32 for receiving the slide and supporting the same under the grill container 28 to form a bottom for the same. The housing also has a frontal opening below the slot 30 for the insertion of a drawer 33 formed with a frontal knob 34. As shown in Fig. 4, the drawer extends to almost full depth across the interior of the housing, so that its capacity is ample when the slide 31 is drawn forward for receiving the cooked frankfurters; and the opening of the drawer places these in convenient access to be picked up with a fork when they are to be served.

Figs. 4 and 6 indicate that the front and rear walls of the enclosure 25 receive a pair of electrical heating units 35 of the type employed in griddles or electric hot plates. These units are therefore positioned vertically in opposed relation; and the walls to which they are attached carry sets of guard rods 36 in front of the heating units for the protection of such units against interference by external objects.

The housing receives an electric supply cord 37 for the heating units 35, such supply cord first passing in the form of conductors 38 to a conventional timer 39 and thence in the form of conductors 40 to the heating units. Branch conductors 41 extend to a signal light 42 which is lighted when the appliance is in operation. No detailed description of the electrical components is considered necessary, since they are well known in the art of electrical heating and cooking appliances.

It is now apparent, when the appliance is turned on and a supply of frankfurters deposited in the grill container 28, that the proximity of the heating units 35 to the frankfurters will cause them to become cooked in short order, the rate of cooking being controlled by the timer 39. The enclosure 25—which may be made of fire brick if practicable—serves as an oven to retain the heat in the zone of the food, so that the same may keep warm in case its removal is temporarily delayed; or, the timer may be cut to a shorter period in case the food is to remain in the appliance longer, so that the working heat may be retained by the oven to complete the cooking of the frankfurters, saving electric current. At the same time, some of the heat will rise to the top 16 on which the buns or other bread may be laid while the frankfurters are being cooked, so that such buns or bread may be kept warm. In this connection, the wide space around the enclosure also creates a warming oven whose top is of a sufficiently wide area to serve as a hot plate and accommodate an adequate supply of the buns or bread.

It will now be apparent that the above appliance is an article which may be made quite compact, so as to occupy a space on the back counter of a lunchroom, drug store fountain, school and factory cafeterias, etc., no larger than is necessary for a commercial toaster. Yet, the appliance is of a nature to receive orders of frankfurters conveniently, cook them rapidly, keep them hot if necessary, and keep the buns or bread warm, all within the limits of the appliance. Further, the removal of the cooked frankfurters is confined to the zone of the bottom drawer, so that there is no risk of dropping or scattering the food and cause inconvenience or embarrassment. Further, the simple removal of the top bolts enables the top of the appliance to be raised together with the grill container, affording full access to the electric heating units in case the cleaning of the top or grill container is desirable or attention or repair is necessary for the heating units. Finally, the appliance fully encloses all its mechanism, presenting a neat and sanitary appearance.

While I have described the invention along specific lines, various minor changes or refinements may be made therein without departing from its principle, and I reserve the right to employ all such changes and refinements as may come within the scope and spirit of the appended claim.

I claim:

A food cooking appliance comprising a housing, a side enclosure within the same, electric heating units in spaced opposed relation within the enclosure, a top over the latter and the housing and having a perforation over the space between said heating units for the deposit of food into said space, a grill container depending from the top inside of the enclosure and made open at the top and bottom, a slide under the grill container and normally forming a bottom for the same, such slide being movable to a point clearing the grill container, a drawer in the bottom of the housing, and means in the latter for supporting and guiding the slide, such means comprising outward rim flanges at the top and bottom of the enclosure, fastening means directed through the housing top to secure the upper rim flange to such top, walls alongside the drawer for guiding the same, a plate carried by the housing for supporting the bottom rim flange and perforated inwardly thereof, and ways between said walls and plate receiving the side portions of the slide for the support and guidance of the same.

References Cited in the file of this patent
UNITED STATES PATENTS

| Number | Name | Date |
|---|---|---|
| 521,718 | Koll | June 19, 1894 |
| 1,529,342 | Christy | Mar. 10, 1925 |
| 1,720,800 | Morrison | July 16, 1929 |
| 1,821,226 | Mabey | Sept. 1, 1931 |
| 1,841,301 | Schroeder et al. | Jan. 12, 1932 |
| 1,876,901 | Forbes | Sept. 13, 1932 |
| 2,030,047 | Bonzagni et al. | Feb. 11, 1936 |
| 2,151,105 | Hendershot et al. | Mar. 21, 1939 |
| 2,329,937 | Orkfritz | Sept. 21, 1943 |
| 2,357,288 | Ricard | Sept. 5, 1944 |
| 2,384,863 | Warner | Sept. 18, 1945 |
| 2,465,577 | Cox | Mar. 29, 1949 |